United States Patent [19]

Yoshida

[11] Patent Number: 4,850,476
[45] Date of Patent: Jul. 25, 1989

[54] SUSPENDED CYLINDRICAL BELT CONVEYOR SYSTEM

[75] Inventor: Yoshimasa Yoshida, Tokyo, Japan
[73] Assignee: K. K. Nakatani, Tokyo, Japan
[21] Appl. No.: 70,064
[22] Filed: Jul. 6, 1987
[30] Foreign Application Priority Data Jul. 23, 1986 [JP] Japan ................. 61-1743470

[51] Int. Cl.⁴ ............................................ B65G 15/08
[52] U.S. Cl. ................................................... 198/819
[58] Field of Search ........................ 198/819–821, 198/823, 824

[56] References Cited

U.S. PATENT DOCUMENTS

| | | | |
|---|---|---|---|
| 2,928,525 | 3/1960 | Schaeffer | 198/819 |
| 3,164,238 | 1/1965 | McCullagh | 198/819 |
| 3,999,646 | 12/1976 | Yoshida | 198/819 X |
| 4,625,860 | 12/1986 | Kawasaki et al. | 198/819 |

FOREIGN PATENT DOCUMENTS

| | | | |
|---|---|---|---|
| 0210329 | 2/1987 | European Pat. Off. | |
| 0022287 | 2/1977 | Japan | 198/819 |
| 0048312 | 5/1981 | Japan | 198/819 |

Primary Examiner—Robert J. Spar
Assistant Examiner—Lyle K. Kimms
Attorney, Agent, or Firm—Ladas & Parry

[57] ABSTRACT

The present invention relates to a suspended cylindrical belt conveyor system designed to convey materials in a totally sealed endless cylindrical belt conveyor suspended from trolley hangers running on an endless guide rail installed along a transportation route.

6 Claims, 5 Drawing Sheets

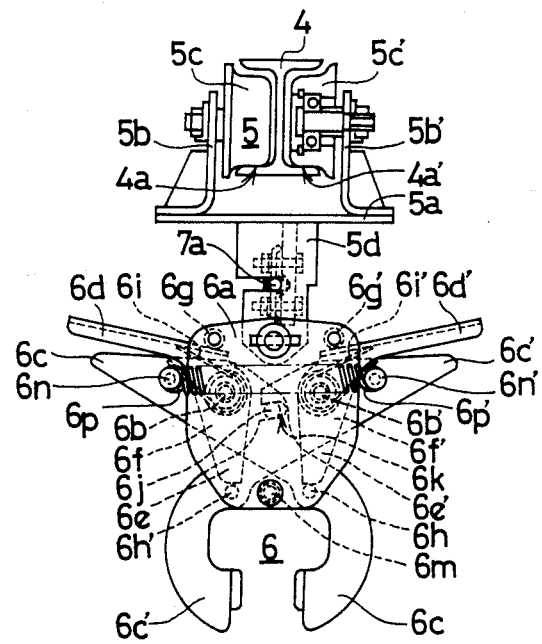
FIG.6
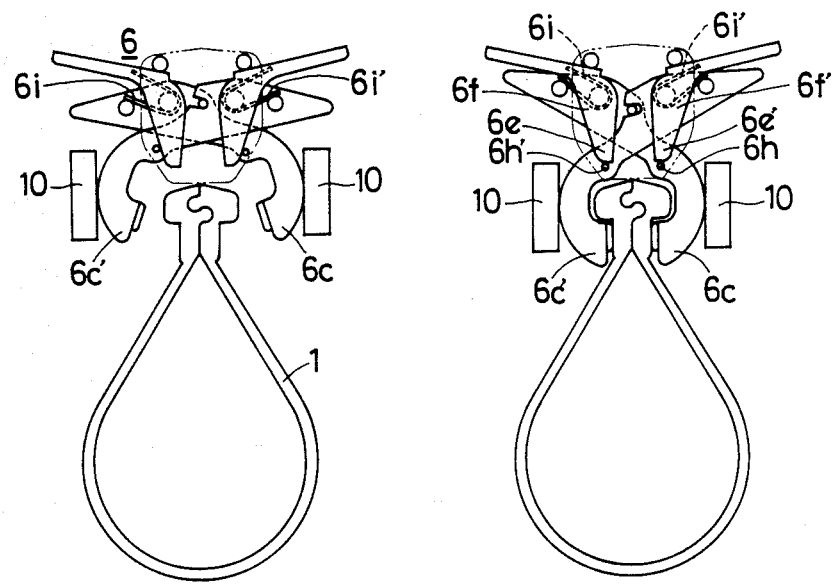
(a)   FIG.8   (b)

FIG.9
(a)
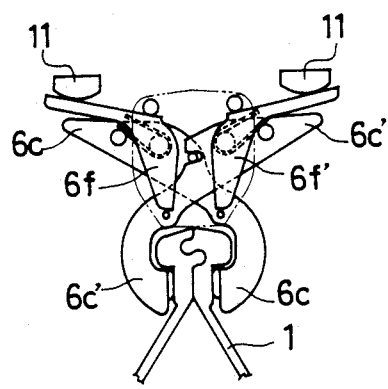
(b)
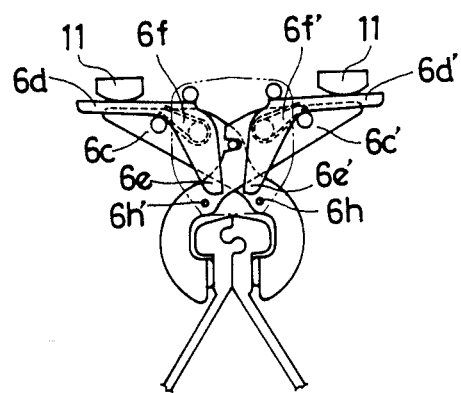
(c)
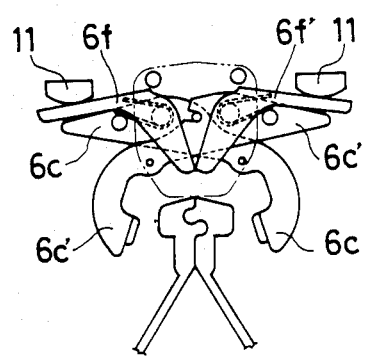
(d)
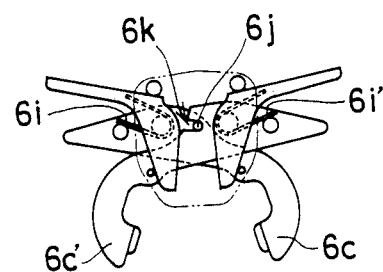

SUSPENDED CYLINDRICAL BELT CONVEYOR SYSTEM

BACKGROUND OF THE INVENTION

The conventional cylindrical belt conveyor has an upper and a lower truss structured frame equipped with nearly ring-shaped rollers installed polygonally at intervals in between to guide a cylindrical belt along, which is unfolded flat at the head and tail sections of the belt conveyor for loading and unloading materials.

Problems with the Conventional Art

In the conventional cylindrical belt conveyor system, a cylindrical belt runs through a multitude of ring-shaped rollers installed at intervals in a conveyor frame along both the carrier and return lines. Along its carrier-side run, the belt tends to expand under the weight of the content it is conveying. Particularly, its fastened selvages experience a strong expansion force and at the same time a heavy holddown pressure of the upper rollers, and are liable to be worn down prematurely. On the other hand, the return-side run of the belt is liable to collapse under its dead load because nothing is stuffed in it, inviting troubles so often. The conventional cylindrical belt conveyor system in which the belt runs on rollers is prone to troubles such as meandering, off-center running, and stalling when materials spilt are encrusted upon rollers to change their diameters.

Measures Taken Against the Problems

The suspended cylindrical belt conveyor system has been invented to solve all these problems with the conventional cylindrical belt conveyor system. Namely, it consists of a rail installed along a transportation route, trolley hangers tied together at intervals and running on said rail, and a totally sealed cylindrical belt suspended from said hangers and circulated along said rail.

The suspended cylindrical belt conveyor system according to the present invention consists of: an endless belt (1); a belt drive (2) for recirculating said belt (1); a belt reversing device (3) that turns over said belt (1) in a manner that said belt (1) will always run with its specified side up; an endless guide rail (4) installed along said belt (1); roller unit (5) running on said rail (4); clamps (6) suspended from said roller unit (5) in a manner to hold the selvages of said belt (1) in between; trolley hangers (7) tied together and riding on said rail (4); carrier rollers rotatably supporting said belt (1) in the vicinity of the turning point of said belt (1); guide roller unit (9) located in the vicinity of said carrier rollers (8) and used to fasten and guide the selvages of said belt (1) to a definite station; a clamper (10) that makes said clamps (6) grip the selvages of said belt (1) firmly after said belt (1) has cleared said guide roller unit (9), in order to suspend said belt (1) in a cylindrical form from said trolley hangers (7); and an unclamper (11) that releases said clamps (6) in order to disengage said belt (1) suspended in a cylindrical form from said trolley hangers (7).

Operation

At the tail end of the suspended cylindrical belt conveyor system, material is charged into the belt (1) through a loading chute (12). The belt (1) is driven by the belt drive (2) installed at the head of the suspended cylindrical belt conveyor system. As the belt (1) carrying material is moving ahead, it is guided by the guide roller unit (9) installed at the tail end and transformed gradually from a flat to a cylindrical form. Just when it has cleared the guide roller unit, it assumes a totally sealed cylindrical form as its selvages have been fastened together. Over the entire span of the guide roller unit (9), the belt (1) is supported by carrier rollers (8). The belt (1) which has been formed into a totally sealed cylinder this way and the trolley hangers (7) which are running on the guide rail (4) in synchronism with the belt (1) pass through the clamper (10) at the tail end of the suspended cylindrical belt (1), during which time the clamper (10) makes the clamp (6) of each trolley hanger (7) grip the closed selvages of the cylindrically formed belt (1). As a result, the cylindrically formed belt (1) is suspended from the trolley hangers (7). Since the guide roller unit (9) controls the selvages of the belt (1) to pass along a predetermined course, the clamp (6) of the trolley hanger can get hold of the selvages without fail. The trolley hangers (7) are tied at intervals in a string to run on the guide rail in procession, and when they hold the selvages of the belt (1), other trolley hangers (7) are also towed along by the drive force of the belt (1). Thus, all the trolley hangers (7) run on the guide rail (4) in synchronism with the belt (1).

When the cylindrically formed belt (1) suspended by the trolley hangers (7) enters the unclamper (11) located at the head end of the syspended cylindrical belt conveyor system, the unclamper (11) releases the clamp (6) of each trolley hanger to free the belt (1). The belt (1) is then unfolded gradually from a cylindrical form into a flat one, and unloads the material through a discharge.

After unloading, the belt (1) is wound up on the drive pulleys (2a) and (2a') of the belt drive (2) and given a tractive force.

After clearing the belt drive (2), the belt (1) is guided through the tension pulleys (14), twisted all around by the belt reversing device (3), and returned to the tail of the system with its top face held upward just as in the carrier run.

After clearing the belt reversing device (3) located at the head, the belt goes through the guide roller unit (9) located at the head, and is again transformed into a cylindrical form. Then, the belt (1) advances into the clamper (10) at the head where it is clamped in the suspended trolley hangers, and moves toward the tail of the system.

When the belt (1) returns to the tail, it first runs through the unclamper (11) where it is released from trolley hangers (7), and then through the belt reversing device (3) where it is twisted 180°. Now it is ready for the belt (1) to convey material again; it returns to the loading chute (12), where it is charged with material again.

The suspended cylindrical belt conveyor system repeats the operations above, hauling material from the tail to the head.

In the return run, material can also be conveyed from the head to the tail if its charged at the head.

The functions of the clamp (6) of the trolley hanger (7), the clamper (10) and the unclamper (11) will be better understood from the following description given in connection with the accompanying drawings illustrating by way of example a preferred embodiment of the present invention.

FIG. 8(a) is a schematic representation of a state in which the clamp (6) of a trolley hanger (7) has approached into the clamper (10). Here, the holding arms (6c) and (6c') of the clamp (6) are forced open by the springs (6i) and (6i').

As the fastening rails of the clamper (10) get closer in clearance in between, the more the belt (1) goes into the clamper (10), the holding arms (6c) and (6c') of the clamp (6) get closed by the clamper (10) as they move forward, finally attaining the state shown in FIG. 8(b).

When the state shown in FIG. 8(b) has been established, the vertical levers (6e) and (6e') of the working levers (6f) and (6f') become in contact with respective dogs (6h) and (6h') at their bottom ends. As the springs (6i) and (6i') make the dogs (6h) and (6h') detain the vertical levers (6e) and (6e'), the holding arms (6c) and (6c') are locked in position, and are not allowed to open. Even after passing through the clamper (10), the clamp (6) is therefore locked in a closed position. In addition, the downward load of the belt (1), acting upon the clamp (6), tends to close the holding arms (6c) and (6c') and thus to hold the selvages of the belt (1) more firmly.

After a trip over the entire length of the suspended cylindrical belt conveyor system, the clamp (6) reaches the unclamper (11) at the head, and assumes a state as shown in FIG. 9(a). As the unclamper (11) is installed along a downward slope in a manner than it will go farther away from the guide rail (4) as it advances, the working levers (6f) and (6f') are forced downward by the unclamper (11) as illustrated in FIG. (b) as the clamp (6) moves forward. As a result, the horizontal levers (6d) and (6d') and the holding arms (6c and (6c') come in contact with each other, and on the other hand, the vertical levers (6e) and (6e') are disengaged from the dogs (6h) and (6h'), unlocking the holding arms (6c) and (6c'). When the clamp (6) advances farther ahead, the holding arms (6c) and (6c') are forced open by the unclamper (11) through the medium of the working levers (6f) and (6f'). Even after the clamp (6) has passed through the unclamper (11), the holding arms (6c') and (6c') remain open under the pressure of the springs (6i) and (6i') until it runs into the clamper (10) again.

Since the pin (6j) and the notch (6k) are engaged with each other slidably, the holding arms (6c) and (6c') open and close by the same stroke.

BRIEF DESCRIPTION OF THE DRAWING

There are shown a preferred embodiment of the present invention in the accompanying drawings in which:

FIG. 6 is a front view illustrating the structural design of the trolley hanger.

FIGS. 8 (a) and (b) roughly illustrate how the clamp and clamper collaborate.

FIGS. 9 (a), (b), (c) and (d) roughly illustrate how the clamp and the unclamper collaborate.

Figure 1:
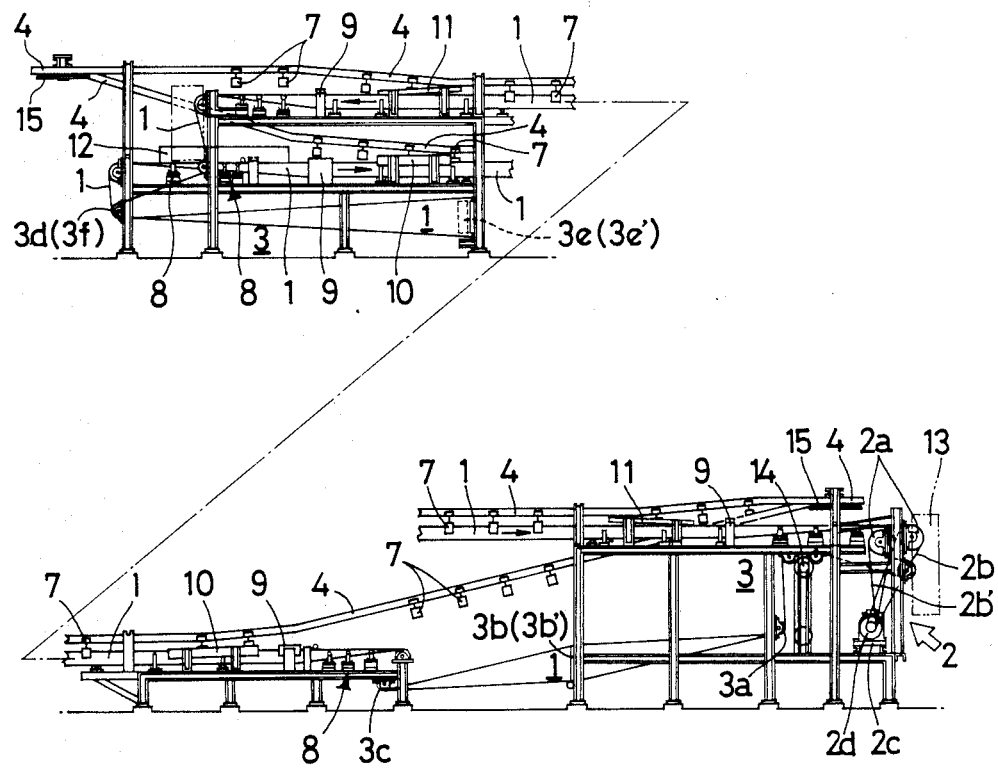
FIG. 1 is an elevational view showing the configuration of the preferred embodiment of the present invention.

(1) Belt (2) Belt drive (2a) Drive pulley (2b) Chain (2c) Motor (2d) Reduction gear (3) Belt reversing device (3a) Horizontal roller (3b) Vertical roller (3c) Horizontal roller (3d) Horizontal roller (3e) Vertical roller (3f) Horizontal roller (4) Guide rail (4a) Flange (5) Trolley roller unit (5a) Saddle (5b) Vertical bracket (5c) Roller (5d) Vertical lever (6) Clamp (6a) Frame (6b) Shaft (6c) Holding arm (6d) Horizontal lever (6e) Vertical lever (6f) Working lever (6g) Lever stopper (6h) Dog (6i) Spring (6j) Pin (6k) Notch (6m) Arm stopper (6n) Pin (6p) Coiled spring (7) Trolley hanger (7a) Linking rope (8) Carrier roller (9) Guide roller unit (9a) Upper roller (9b) Lower roller (9c) Roller (9d) Bracket (10) Clamper (11) Unclamper (12) Loading chute (13) Unloading chute (14) Tension pulley (15) Sheave for linking rope

DETAILED DESCRIPTION OF THE INVENTION

Figure 2:
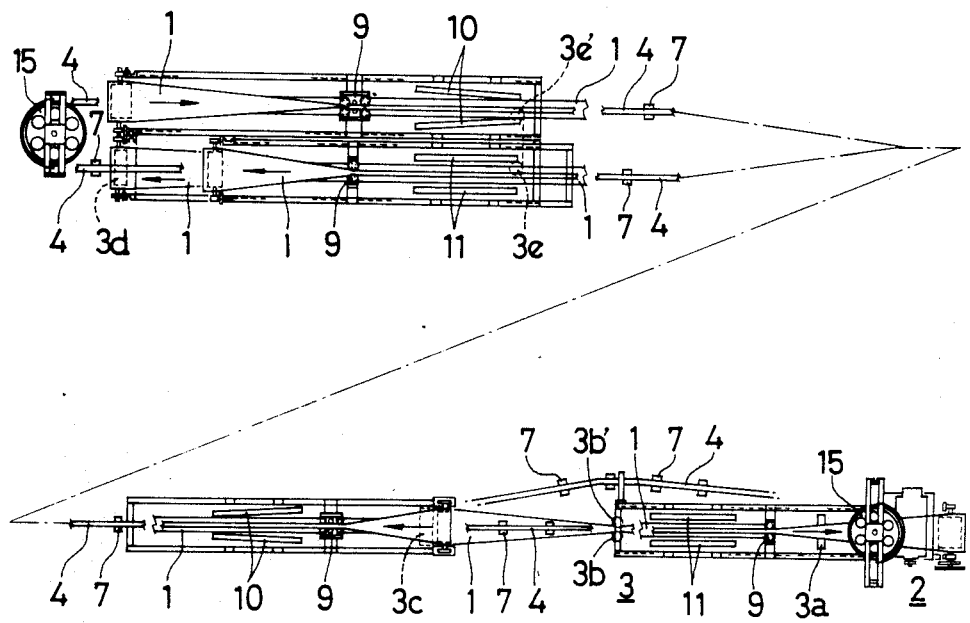
FIG. 2 is a plan view of the preferred embodiment.
Figure 3:
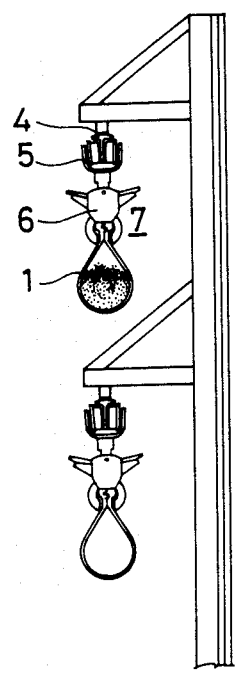
FIGS. 3 and 4 are a schematic representation showing the layouts of guide rail.
Figure 4:
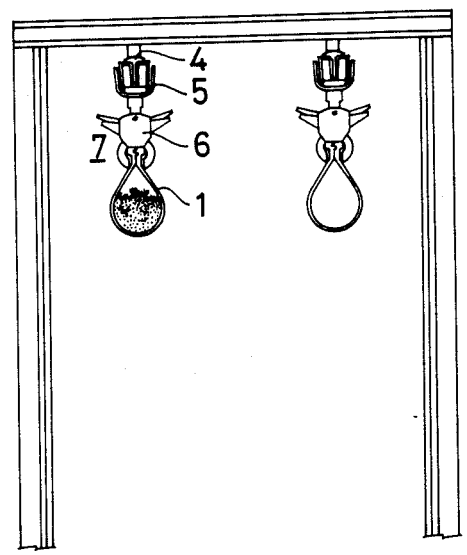
Figure 5:
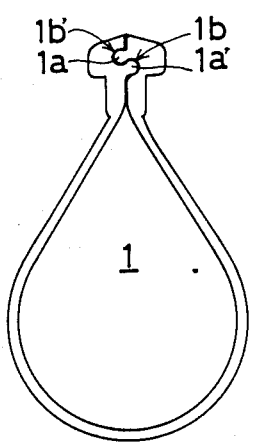
FIG. 5 is a front view of the belt.
Figure 7:
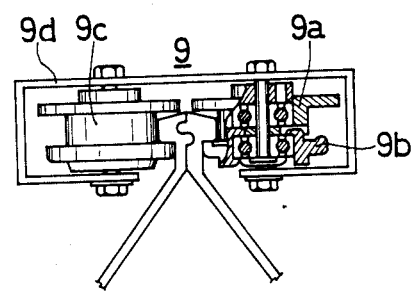
FIG. 7 is a front view of the guide roller unit, showing partly the internal structure of the guide rollers.

The invention will be better understood from the following description given in connection with the accompanying drawings in which: FIG. 1 is a schematic representation showing a side view of a preferred embodiment of the present invention; FIG. 2 is a plan view of said embodiment; FIGS. 3 and 4 are a schematic view showing a few layouts conceivable for the guide rail; FIG. 5 is a front view of the belt; FIG. 6 is a front view showing the construction of the trolley hanger; FIG. 7 is a phantom cross-sectional view of the guide roller unit; FIG. 8(a) and (b) illustrate the interaction of the clamp and clamper; and FIGS. 9(a), (b), (c) and (d) illustrate the interaction between the clamp and the unclamper.

In the drawings (1) denotes the belt which is endlessly installed. In the preferred embodiment herein, the belt (1) is provided with a tongue (1a) and a groove (1b) in each of its selvages to mate with a groove (1b') and a tongue (1a) of the other. (See FIG. 5)

In the drawings, (2) is a belt drive used to turn the endless belt (1) around. In the preferred embodiment, the belt drive (2) is equipped with two parallel drive pulleys (2a) and (2a'), a motor (2c) driving said drive pulleys (2a) and (2a') via chains (2b) and (2b'), and a reduction gear (2d) which reduces the input speed of said motor (2c) to a lower output speed at which to drive said drive pulleys (2a) and (2a').

Indicated at (3) is a belt reversing device which is designed to run the belt (1) with its specified face always up during travel between head and tail of the suspended cylindrical belt conveyor system. The belt reversing device (3) at the head of the suspended cylindrical belt conveyor system according to the preferred embodiment of the present invention is composed of: a horizontal roller (3a); two vertical rollers (3b) and (3b') to guide the belt (1) through in between; and another horizontal roller (3c) which turns the belt (1) 90° which has already been twisted 90° by said vertical rollers (3b) and (3b'). On the other hand, the belt reversing device (3) at the tail is composed of: a horizontal roller (3d); two vertical rollers (3e) and (3e') installed in a manner to guide the belt (1) from the return run to the carrier run while twisting it 90°; and another horizontal roller (3f) which twists the belt (1) which has already been turned 90° by said vertical rollers (3e) and (3e').

Indicated at (4) is the guide rail according to the preferred embodiment of the present invention. It is installed endlessly along the belt (1). According to the present invention, the guide rail (4) is made of an I-beam in accordance with the Japanese Industrial Standards (JIS), but may be of channels, cylindrical steel pipes, or the like. The guide rail (4) may be supported by poles, overhead suspension hangers, wall brackets, or the like. The guide rail (4) may be double decked as illustrated in FIG. 3 or installed side by side as illustrated in FIG. 4.

Indicated at (7) is a trolley hanger, which is equipped with: trolley roller unit (5) running on the guide rail (4); and a clamp (6) suspended from said trolley roller unit (5) to take a tight hold on the closed selvages of the belt (1). A number of trolley hangers (7) are tied in a string at intervals to run on the guide rail (4) in procession. (See FIGS. 1 through 4) In the preferred embodiment, the trolley roller unit (5) of the trolley hanger (7) in the preferred embodiment of the present invention is provided with rollers (5c) and (5c') mounted on the vertical brackets (5b) and (5b') of a nearly U-lettered saddle (5a). These rollers (5c) and (5c') rest rotatably on the lower flanges (4a) and (4a') of the guide rail (4). The underside of the saddle (5a) is fitted with the clamp (6) via a vertical distance piece (5d). The vertical distance piece (5d) is designed to grip a linking rope (7a). (See FIG. 6)

The clamp (6) of the trolley hanger (7) in the preferred embodiment is provided with: a frame (6a); two shafts (6b) and (6b') mounted on said frame (6a); nearly J-lettered holding arms (6c) and (6c') mounted rotatably on said shafts (6b) and (6b') in a manner that they will cross each other; and nearly L-lettered working levers (6f) and (6f') that turn on the same shafts (6b) and (6b') as for the holding arms (6c) and (6c'). The working levers (6f) and (6f') are composed of respectively horizontal levers (6d) and (6d') and vertical levers (6e) and (6e'). Provided between the holding arms (6c) and (6c') and the working levers (6f) and (6f') are springs (6i) and (6i') which always exert a force to open the holding arms (6c) and (6c'). The frame (6a) is provided with lever stoppers (6g) and (6g') that function to stop the horizontal levers (6d) and (6d') of the working levers (6f) and (6f') at a nearly horizontal level. The horizontal levers (6d) and (6d') have a J-shaped cross section, and come in contact with the holding arms (6c') when they are turned downward. The holding arms (6c) and (6c') are provided with dogs (6h) and (6h'), respectively. The dogs (6h) and (6h') are located to come in contact with the underside of the vertical levers (6e) and (6e') when the holding arms (6c) and (6c') are closed with the horizontal levers (6d) and (6d') in contact with respective lever stoppers (6g) and (6g'). One holding arm (6c) is provided with a pin (6j). The pin (6j) is located at a position where the holding arms (6c) and (6c') cross each other. The other arm (6c') is provided with a notch (6k) into which the pin (6j) is engaged. (See FIG. 6)

It is dsirable to provide an arm stopper (6m) on the frame (6a) so that the holding arms (6c) and (6c') will not go below a lower limit. It is also desirable to mount pins (6n) and (6n') on the holding arms (6c) and (6c') and to provide a coiled spring (6p) between pins (6n) and (6n'). These accessories ensure smooth operation of the holding arms (6c) and (6c') without rattling. In the preferred embodiment of the present invention, the trolley hangers (7) are connected together with a linking rope (7a). A rope sheave (15) is provided rotatably at the curved section of the guide rail (4) so that the linking rope (7a) will not get slackened.

Indicated at (8) are carrier rollers. The belt (1) is released from the trolley hangers (7) at a position near the turning point. At such a point, the belt (1) is supported by the carrier rollers (8) instead of by the trolley hangers for its smooth travel. The trough angle of the carrier rollers (8) should preferably be so set as to meet the contour of the belt (1) at each specific position.

Indicated at (9) is a guide roller unit, which is located near the carrier rollers (8). The guide roller unit (9) is designed to make the belt (1) run a definite span with its selvages fastened together. In the preferred embodiment, the guide roller unit (9) uses sealed rollers (9c) having a nearly H-lettered cross section. Each sealed roller (9c) is divided into an upper roller (9a) and a lower roller (9b). The sealed rollers (9c) are installed to oppose each other and are housed in a squared-C type channel (lipped channel) bracket (9d). The belt (1) is guided through the clearance between the sealed rollers (9c) over a definite span with its selvages closed. (See FIG. 7)

Indentified by (10) is a clamper, which is designed to make the clamp (6) of each trolley hanger (7) hold and suspend the selvages of the belt (1) that has passed the guide roller unit (9). In the preferred embodiment of the present invention, the clamper (10) is provided with a pair of fastening rails, the clearance between which gets narrower as the belt (1) advances.

Indicated at (11) is an unclamper, which is designed to disengage the clamp (6) of each trolley hanger (7) to free the cylindrical suspended belt (1) from the trolley hangers (7). In the preferred embodiment, the unclamper (11) is composed of a pair of unfastening rails. These rails are sloped to go more apart from the guide rail (4) the more the belt (1) advances.

Advantages of the Invention

The suspended cylindrical belt conveyor system according to the present invention is similar in the design of loading and unloading units to the conventional conveyor system, but is very compact because it only requires a guide rail each for the carrier run and return run, a belt and trolley hangers for suspending the belt, and also because it dispenses with idlers, frame, conveyor cover, inspection gallery and the like indispensable for the conventional belt conveyor system.

This simplicity saves construction cost greatly; the longer the haul, the lower the installation cost per unit length. This suspended cylindrical belt conveyor system finds many uses not achievable by the conventional belt conveyor system, particularly where it is required to transport materials at elevated positions, underground, in tunnels, and in hilly terrains defying the installation of the conventional belt conveyor system.

In the suspended cylindrical belt conveyor system according to the present invention, the belt which is turned into a cylindrical form is suspended and driven along an endless route. Over the entire route, the belt is totally sealed on both the carrier and return runs, eliminating environmental pollution and operating losses due to spillage, leakage and flying of materials being transported. It can be installed freely - not only for straight stretches, but also for up-and-down and meandering courses to meet any specific terrain conditions, making it possible to convey materials over a long distance without troublesome trans-shipping.

In the suspended cylindrical belt conveyor system according to the present invention, the belt formed into a cylindrical form is suspended and driven in a loop, and lasts longer than the conventional belt because it experiences less wear and tear. In addition, the belt is at once suspended and driven by the trolley hangers running on the guide rail, the power requirement for the entire suspended cylindrical belt conveyor system is extremely reduced. All these features minimize the operating and maintenance expenses and energy consumption.

In the suspended cylindrical belt conveyor system according to the present invention, materials can be conveyed even on the return run of the belt.

From what has been explained in the foregoing, the uses, advantages and outstanding features of the suspended cylindrical belt conveyor system according to the present invention will be well understood.

What is claimed:

1. A suspended cylindrical belt conveyor system comprising in combination: an endless belt (1) having selvages; a belt drive (2) for circulating said belt (1); a belt reversing device (3) that turns said belt (1) over in a manner such that said belt (1) will always run with a specified side up; an endless guide rail (4) installed along said belt (1); a trolley roller unit (5) for operating on said guide rail (4); clamps (6) suspended from said roller unit (5) in a manner to hold the selvages of said belt (1); trolley hangers (7) tied together and riding on said guide rail (4) and associated with said clamps (6); carrier rollers (8) rotatably supporting said belt (1) in the vicinity of said belt reversing device (3); a guide roller unit (9) located in the vicinity of said carrier rollers (8) and used to bring said selvages of said belt (1) together such that said belt (1) takes on a somewhat cylindrical form; a clamper (10) for causing said clamps (6) to grip the selvages of said belt (1) after said belt (1) has cleared said guide roller unit (9) to suspend said belt (1) in said somewhat cylindrical form from said trolley hangers (7); an unclamper (11) for unclamping said clamps (6) to release said belt's (1) cylindrical suspension in said trolley hangers (7); wherein said clamps (6) are suspended from said trolley hangers (7) and are comprised of:

a frame (6a);

two shafts (6b, 6b',) attached to said frame (6a);

somewhat J-shaped holding arms (6c, 6c'), horizontal levers (6d, 6d'), and vertical levers (6e, 6e') all of which are mounted rotatably on said shafts (6b, 6b');

working levers (6f, 6f') in contact with said holding arms (6c, 6c') when said horizontal levers (6d, 6d') are turned downwardly;

lever stoppers (6g, 6g') for holding said horizontal levers (6d, 6d') of said working levers (6f, 6f') at a generally horizontal level;

dogs (6h, 6h') provided on said holding arms (6c, 6c) such that said dogs come in contact with said vertical levers (6e, 6e') when said horizontal levers (6d, 6d') are in contact with said lever stoppers (6g, 6g'), said holding arms (6c, 6c') being closed;

springs (6i, 6i') attached to bias said holding arms (6c, 6c') in an open position and said horizontal levers (6d, 6d') upwardly;

pin (6j) mounted on one of said holding arms (6c) where said holding arms (6c, 6c') intersect each other;

a notch (6k) defined in one of said holding arms (6c') for engaging with said pin (6j).

2. The suspended cylindrical belt conveyor system of claim 1 in which said guide roller unit (9) is a sealed unit comprised of: a pair of rollers (9c) having a generally H-lettered cross section; and a generally C-lettered bracket (9d) for accommodating said rollers (9c).

3. A suspended cylindrical belt conveyor system of claim (1) in which said unclamper (11) comprised of a pair of unfastening rails that slope away from said rail (4).

4. The suspended cylindrical conveyor system of claim 1 wherein said belt selvages are comprised of male and female sections that mate with each other when said belt is clamped within said clamps.

5. The suspended cylindrical belt conveyor system of claim 1 wherein said clamper (10) is comprised of a pair of fastening rails said rails having opposing ends and lying nearer to each other at one end than at an opposing end.

6. A suspended belt conveyor system including at least one clamp (6), said clamp comprising:

said clamp (6) being suspended from said trolley hangers (7) and comprised of: a frame (6a);

two shafts (6b, 6b') attached to said frame (6a);

somewhat J-shaped holding arms (6c, 6c'), horizontal levers (6d, 6d'), and vertical levers (6e, 6e') all of which are mounted rotatably on said shafts (6b, 6b');

working levers (6f, 6f') in contact with said holding arms (6c, 6c') when said horizontal levers (6d, 6d') are turned downwardly;

lever stoppers (6g, 6g') for holding said horizontal levers (6d, 6d') of said working levers (6f, 6f') at a generally horizontal level;

dogs (6h, 6h') provided on said holding arms (6c, 6c') such that said dogs come in contact with said vertical levers (6e, 6e') when said horizontal levers (6d, 6d') are in contact with said lever stoppers (6g, 6g'), said holding arms (6c, 6c') being closed;

springs (6i, 6i') attached to bias said holding arms (6c, 6c') in an open position and said horizontal levers (6d, 6d') upwardly;

pin (6j) mounted on one of said holding arms (6c) where said holding arms (6c, 6c') intersect each other; a notch (6k) defined in one of said holding arms (6c') for engaging with said pin (6j).

* * * * *